United States Patent [19]

Watkins, Jr.

[11] 4,346,904
[45] Aug. 31, 1982

[54] HONEYCOMB STRUCTURE FOR USE IN ABRADABLE SEALS

[76] Inventor: Shelton Watkins, Jr., 185 Westwind Rd., Louisville, Ky. 40207

[21] Appl. No.: 210,822

[22] Filed: Nov. 26, 1980

[51] Int. Cl.³ .......................... B32B 3/12; F16J 15/28
[52] U.S. Cl. ...................................... 277/236; 415/174
[58] Field of Search ............ 277/96 R, 236, DIG. 10; 415/170, 174

[56] References Cited

U.S. PATENT DOCUMENTS

| | | | |
|---|---|---|---|
| 3,200,489 | 8/1965 | Keeleric | 415/174 |
| 3,649,033 | 3/1972 | Konko | 277/96 |
| 3,656,862 | 4/1972 | Rahaim et al. | 415/174 |
| 3,916,054 | 10/1975 | Long et al. | 277/236 |
| 4,295,785 | 10/1981 | Lardellier | 415/714 |

*Primary Examiner*—Robert I. Smith
*Attorney, Agent, or Firm*—Maurice L. Miller, Jr.

[57] ABSTRACT

An improved ribbon reinforced honeycomb structure is disclosed wherein an elongate steel ribbon is interposed between successive semi-hexagonal strips which form the familiar hexagonal multi-cellular structure. The width of the ribbon is less than the widths of the strips between which it is interposed. Such improved honeycomb structure may be used to form part of an abradable seal in aircraft gas turbine engines.

6 Claims, 4 Drawing Figures

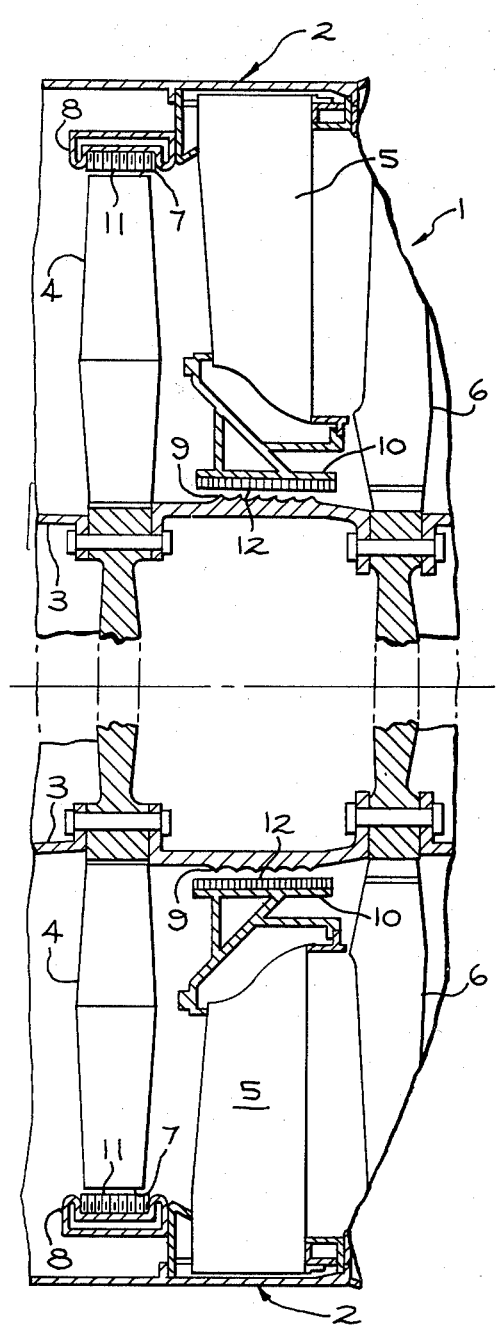
FIG. 1
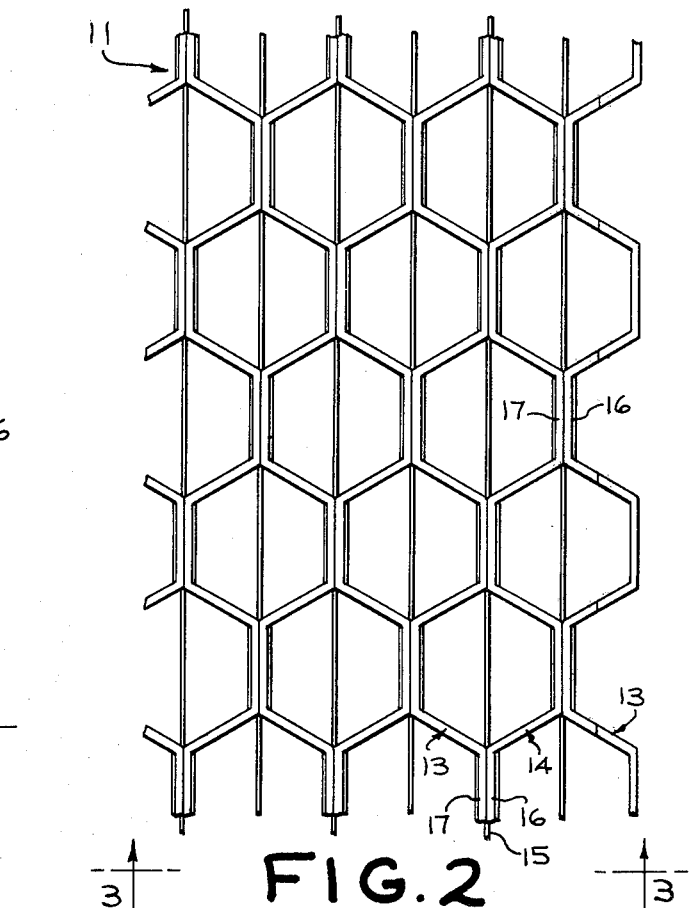
FIG. 2
FIG. 3
FIG. 4

HONEYCOMB STRUCTURE FOR USE IN ABRADABLE SEALS

BACKGROUND OF THE INVENTION

This invention relates generally to abradable fluid seals such as, for example, those used to provide a relatively fluid tight seal between the tips of turbine blades and the surrounding casing in an aircraft gas turbine engine.

More specifically, this invention relates to the honeycomb steel band which is laid along and brazed to a strong annular steel base to form part of a turbine shroud and whose hexagonal cell structure is filled with an abradable material such as a sintered nickel-alloy to provide thermal insulation for the annular steel base. Such conventional annular seals are affixed to the turbine casing so that the abradable material in the honeycomb is very closely spaced from the tips of the rotating turbine blades. The abradable material in the honeycomb cells can readily withstand the high temperatures encountered in the turbine stages of the engine and protects the annular steel backing from high temperatures as well as providing a smooth gas flow surface. However, under extreme operating conditions, temperatures, etc., the turbine blades may expand sufficiently to actually rub the surface of the abradable alloy overfilling the honeycomb material, whereupon the abradable sealant material will yield so that the turbine blades will not be damaged. An example of such a conventional honeycomb steel band is disclosed in U.S. Pat. No. 2,963,307 issued to M. Bobo on Dec. 6, 1960. Variations of this basic honeycomb structure are disclosed in U.S. Pat. No. 3,867,061 issued to Seymour Moskowitz, on Feb. 18, 1975 and in U.S. Pat. No. 4,063,742 previously issued to me on Dec. 20, 1977.

One difficulty that has been encountered using the abradable nickel-alloy filler in conventional honeycomb is that, over a relatively long period of time, the abradable material filling a given cell of the honeycomb can become loosened and fall out due to thermal cycling, rubbing of the abradable filler against the turbine blades, engine vibrations, or can otherwise be blown out by action of the hot gas flowing across the seal. It is thus highly desirable to provide an improved honeycomb structure with an increased ability to hold and confine the abradable alloy filler to thus minimize the quantities of such filler that will be chipped out of the honeycomb when the filler surface is rubbed by the tips of the turbine blades.

My present invention substantially overcomes this and other difficulties which have long been encountered using the conventional honeycomb in abradable seals of the gas turbine prior art.

SUMMARY OF THE INVENTION

It is an object of the present invention to provide an improved steel honeycomb structure.

It is a further object of the present invention to provide an improved steel honeycomb structure for use as part of an abradable fluid seal in aircraft gas turbine engines.

It is also an object of the present invention to provide an improved honeycomb structure for use in abradable fluid seals in gas turbine engines which has increased ability to hold and maintain abradable filler material therein.

Briefly, in accordance with these and other objects of my invention, there is provided an improved steel honeycomb structure of the type which conventionally includes a plurality of semi-hexagonal elongate strips joined together along adjacent engaging strip sections. The improvement comprises an elongate ribbon having a width less than the width of said strips interposed between successive ones of the strips. The edges of the ribbon are disposed within the top and bottom margins of the hexagonal cell structure formed by the joined strips.

These and other objects, features and advantages of the present invention will become apparent to those skilled in the art from the following detailed description and attached drawings upon which, by way of example, only the preferred embodiments of the present invention are illustrated.

BRIEF DESCRIPTION OF THE DRAWINGS

FIG. 1 shows a fragmented cross-sectional view of the turbine section of a gas turbine engine illustrating a typical use for abradable fluid seals using honeycomb webbing with an abradable alloy filler.

FIG. 2 shows a plan view of an improved honeycomb structure usable in the abradable fluid seals of the gas turbine engine of FIG. 1, thus illustrating one preferred embodiment of the present invention.

FIG. 3 shows a cross-sectional elevation view of the improved honeycomb structure of FIG. 2 as viewed along cross-section lines 3—3 of the latter figure and illustrating one preferred position for the spot-welds thereof.

FIG. 4 shows a fragmented cross-sectional elevation view of the improved honeycomb structure of FIG. 2 as viewed along cross-section lines 3—3 of the latter figure but illustrating alternative positioning for the spot-welds thereof.

DESCRIPTION OF THE PREFERRED EMBODIMENTS

Referring now to the drawing figures, there is shown in FIG. 1 a conventional gas turbine engine 1 which includes a stationary casing 2 and rotor 3. In operation, hot motive gas passes successively through a series of rotating blades or a bucket 4 of a first turbine stage, a stationary nozzle diaphragm 5, a rotating bucket 6 of a second stage, onward through a succeeding nozzle diaphragm, not shown, and then through a final turbine stage, also not shown. For purposes of engine operating efficiency, it is desirable to prevent or at least minimize the leakage of hot motive gases between bucket tips, such as at 7, and adjacent surrounding casing structure or shroud 8 so that all or substantially all of such gases flow instead through and between the rotating buckets 4, 6 and the intervening stationary nozzle diaphragm 5 as such gases pass through and between the first and second engine turbine stages. The same gas flow pattern is of course equally desirable in all stages of the gas turbine engine 1. Moreover, as is also well known, it is desirable to prevent gas leakage between annular serrations 9 of the rotor 3 located between turbine stages and adjacent end portions 10 of the stationary nozzle diaphragm 5. To achieve this objective, abradable fluid seals 11, 12 are fixedly attached to the annular interior surface of the shroud 8 and end portion 10 of the diaphragm 5, respectively, such that the inner surfaces of the seals are very closely spaced apart from the bucket tips 7 and serrations 9. These seals 11, 12 have in the past been of the conventional type such as those disclosed in U.S. Pat. No. 2,963,309 to Bobo and in my U.S. Pat. No. 4,063,742.

Now in accordance with the principles of my invention and referring to FIG. 2, there is shown an improved steel honeycomb structure which, among other things, may be used as part of the abradable fluid seals 11, 12, of FIG. 1. A pair of semihexagonal elongate steel strips 13, 14 are mated together in the usual manner to form what would ordinarily be conventional honeycomb structure having multiple cells of hexagonal cross-section except that in this case a ribbon 15 of steel having substantially lesser width than the widths of the steel strips 13, 14 is interposed between the latter. The process of applying a ribbon 15 between each succeeding strip 13 and 14 is thus repeated until the desired width of steel ribbon reinforced honeycomb is obtained. Ordinarily the width of the ribbon reinforced honeycomb structure of the present example would be made slightly greater than that desired, after which the resulting honeycomb band is stretched to reduce its width to the precise width desired. For this reason, I prefer to spot-weld each adjacent set of the semi-hexagonal strips 13 and 14 together upon their engaging sections 16, 17 of surface above and below the ribbon 15 as shown in FIG. 3 by spot-welds 18, 19.

Thus, in the preferred example of FIGS. 2-3, the ribbons 15 interposed between the semi-hexagonal strips 13, 14, while being confined between the engaging strip sections 16, 17 and the upper and lower spot-welds 18, 19, are nevertheless free to slide longitudinally along the engaging strip sections 16, 17. As a consequence of this freedom of movement of the ribbons 15 relative to the strip sections 16, 17, the strips 13, 14 may be confined in clamps at either end thereof and stretched to reduce the overall width of the honeycomb structure. The ribbons 15, being of lesser width than the widths of the strips 13, 14 and being positioned intermediate the top and bottom of the honeycomb cells formed by the strips 13, 14 as viewed most clearly in FIG. 3, will slide freely to allow the strips 13, 14 to be stretched to reduce the honeycomb width to the precise width desired.

Referring now to FIG. 4, there is shown alternative positioning for the spot-welds of the ribbon reinforced honeycomb structure of FIG. 2. In this case, tweezer type welders need to be used to weld each of the sections 16, 17 to the ribbons 15 after the strips 13, 14 have been disposed side-by-side to form the complete honeycomb structure and after the resulting unwelded structure has been stretched to obtain the desired overall width. A single spot-weld may be made between the ribbons 15 and each engaging section 16, 17 of the strips 13, 14 as at spot-welds 20, 21 in FIG. 4. In the latter example, therefore, the ribbons 15 are fixedly joined by spot-welds 20, 21 to adjacent sections 16, 17 of the strips 13, 14, respectively, and are not free to move or slide relative to the latter after the welding operations have been completed.

While I recommend that the width of the strips 13, 14 relative to the width of the ribbons be at least 3:1, successful tests have been run using the ribbon reinforced honeycomb structure of my invention in abradable seals of commercial aircraft gas turbine engines wherein the width of the strips 13, 14 relative to that of the ribbon 15 was on the order of 4:1. It is believed that the addition of the ribbons 15 between the semi-hexagonal strips 13, 14 of the honeycomb structure 11 provides a mechanical lock for the abradable alloy filler material filling the hexagonal cells of the honeycomb. Because of this mechanical lock feature of the ribbons 15, the abradable filler is more readily retained in the cells of the honeycomb structure of my invention than has been obtainable in the past using abradable seals having conventional honeycomb structure.

Although the present invention has been described with respect to specific details of certain preferred embodiments thereof, it is not intended that such details limit the scope and coverage hereof otherwise than as set forth in the following claims.

I claim:

1. In an improved honeycomb structure of the type which conventionally includes a plurality of semi-hexagonal elongate strips joined together along adjacent engaging strip sections, the improvement comprising an elongate ribbon having a width less than the width of said strips interposed between successive ones of said strips, the edges of said ribbon being within the top and bottom margins of the hexagonal cell structure formed by said joined strips.

2. The improved honeycomb structure of claim 1 wherein said strips are joined together along adjacent engaging strip sections by welds positioned between said strip sections beyond and on both sides of the edges of said ribbon, whereby said ribbon is slidably confined between said adjacent engaging strip sections.

3. The improved honeycomb structure of claim 1 wherein said ribbon is welded to each adjacent engaging one of said strip sections, whereby said ribbon is fixedly joined to and confined between said adjacent engaging strip sections.

4. An abradable seal including the improved honeycomb structure of claim 1.

5. An abradable seal including the improved honeycomb structure of claim 2.

6. An abradable seal including the improved honeycomb structure of claim 3.

* * * * *